US007987736B2

(12) United States Patent
Rapaud

(10) Patent No.: US 7,987,736 B2
(45) Date of Patent: Aug. 2, 2011

(54) DEVICE, USE AND METHOD FOR DRAWING OFF A LIQUID

(75) Inventor: Michel Rapaud, La Tour de Salvagny (FR)

(73) Assignee: Biomerieux, Marcy l'Etoile (FR)

( * ) Notice: Subject to any disclaimer, the term of this patent is extended or adjusted under 35 U.S.C. 154(b) by 527 days.

(21) Appl. No.: 12/087,654

(22) PCT Filed: Mar. 12, 2007

(86) PCT No.: PCT/FR2007/050909

§ 371 (c)(1),
(2), (4) Date: Jul. 11, 2008

(87) PCT Pub. No.: WO2007/104886

PCT Pub. Date: Sep. 20, 2007

(65) Prior Publication Data

US 2009/0000693 A1 Jan. 1, 2009

(30) Foreign Application Priority Data

Mar. 13, 2006 (FR) ..................................... 06 02161

(51) Int. Cl.
*B01L 3/02* (2006.01)
*G01N 1/14* (2006.01)

(52) U.S. Cl. .................................. 73/864.11; 73/864.22

(58) Field of Classification Search ........................ None
See application file for complete search history.

(56) References Cited

U.S. PATENT DOCUMENTS 3,795,149 A * 3/1974 Gillette et al. ......... 73/864.22 X
3,834,590 A 9/1974 Robinson et al.
3,842,680 A * 10/1974 Vollick et al. .............. 73/864.22
3,976,429 A * 8/1976 Ginsberg ............... 73/864.22 X
4,041,764 A 8/1977 Sabloewski et al.
4,879,242 A * 11/1989 Tsukioka ........................ 436/54
5,084,241 A * 1/1992 Parker ........................... 422/519
5,460,782 A * 10/1995 Coleman et al. ....... 73/864.11 X
5,660,796 A * 8/1997 Sheehy ......................... 422/512
5,780,306 A * 7/1998 Schels et al. ........... 73/864.22 X
6,632,287 B1 * 10/2003 Colin et al. ....................... 134/1
6,641,545 B1 * 11/2003 Colin et al. .................. 600/573
6,848,633 B2 * 2/2005 Ryser ..................... 73/864.11 X
7,077,018 B2 * 7/2006 Sinclair .................. 73/864.11 X
2006/0177812 A1 * 8/2006 Schnetz et al. .................... 435/4

FOREIGN PATENT DOCUMENTS

EP 1319437 A1 * 6/2003
FR 2 330 456 A1 6/1977
JP 55116239 A * 9/1980
WO WO 95/10035 A2 4/1995
WO WO 99/27973 A1 6/1999
WO WO 99/50674 A1 10/1999
WO WO 0056455 A2 * 9/2000
WO WO 2005046486 A1 * 5/2005

* cited by examiner

*Primary Examiner* — Thomas P Noland
(74) *Attorney, Agent, or Firm* — Oliff & Berridge, PLC

(57) ABSTRACT

A device for drawing off a liquid from a container comprising a drawing-off needle having a free lower end and an upper end, a suction deliverer connected to the upper end of the needle, and a blower carried by the needle allowing drops of the liquid present on the inside wall(s) of the container in the bottom section of the container to be concentrated.

18 Claims, 4 Drawing Sheets

DEVICE, USE AND METHOD FOR DRAWING OFF A LIQUID

FIELD

The present invention relates to a device for drawing off a liquid from a container, making it possible to concentrate the drops of liquid present on the inside wall(s) of the container in the bottom section of said container.

The present invention also relates to a method for drawing off a liquid present in a container using the above device.

The present invention finally relates to the use of the above drawing-off device for controlling the level of liquid present in the container.

BACKGROUND

Up until now, this type of drawing-off device simply allows, by contact with the liquid to be drawn off, either the supply of a liquid of interest which it contains or the withdrawal of another liquid of interest present in a container.

Such devices in general consist of hollow pipettes or needles linked to pumps. Some that are more sophisticated allow cleaning of the external walls of said pipettes or needles, which have been soaked in the liquid drawn off or to which additional liquid has been added. That is the case for example in the patent application WO-A-99/27973 filed under the priority of 27 Nov. 1997 by the applicant. It relates to a method for decontaminating a hollow metal needle intended for drawing off and/or distributing a contaminating liquid, the needle cooperating with electric power supply means, which make it possible to establish an electric current in the needle in order to decontaminate and preserve the integrity of said needle for the purpose of its reuse. Others are equipped with means, which avoid making these external walls of the drawing-off components dirty, as is the case in patent application WO-A-99/50674 filed under priority of 1$^{st}$ April and of 22 Jun. 1998 by the applicant. This application relates to a method for drawing off a biological sample by means of a suction/delivery apparatus such as a manual or automatic pipette incorporated or not incorporated into an automated machine. However, it also relates to a method for detecting the free surface of a biological sample, an apparatus for drawing off a sample, such as a pipette, and an apparatus for detecting the free surface of a biological sample.

However, when a liquid is added or even optionally withdrawn from a container, such as a tube, a cavity of a microtiter plate, splashes may be produced and drops may thus form on the inside walls of this container. The problem then lies in the fact that these drops contain essential components, which may be useful to a subsequent biological reaction, and in the fact that as these components are not present in the liquid present at the bottom of said container, they cannot participate in said reaction. Thus, in the case of nucleic acids, the quantities of these nucleic acids extracted from cells by lysis or any other technique are few. It is therefore desirable to amplify these molecular targets by adding amplification primers and detection probes. If isolated drops contain even only part of these biological components: targets, primers and/or probes, the amplification and/or the detection reaction that will follow will be disrupted. The disruption will be all the more great if it is desired to perform a quantitative detection and not merely a qualitative detection of the target.

Another problem is the determination of a volume of liquid present in a container. Some controls are sometimes necessary in order to know precisely the volume of liquid distributed into a container or a series of containers. In this case, it is necessary to know precisely said volume. As a result, the presence of a drop or drops that has (have) not been recovered or that cannot be recovered can generate erroneous vales and affect the final result.

No document of the state of the art provides solutions to these problems.

SUMMARY

The present invention proposes to provide a solution to these problems in order to respond to the expectation of users.

To this effect, the present invention relates to a device for drawing off a liquid from a container comprising:

- a drawing-off needle having a free lower end and an upper end,
- suction-delivery means connected to the upper end of the needle,
- blowing means carried by said needle allowing the drops of liquid present on the inside wall(s) of the container in the bottom section of said container to be concentrated.

According to a first variant embodiment, the drawing-off needle consists of a tube open at both its ends; the container intended to contain the liquid to be drawn off consists of a tube of greater diameter than that of the lower end of the needle, open only at its upper end.

According to a second variant, the blowing means comprise at least one side opening to the needle; this/these opening(s) allow an air stream to be sent over the inside wall(s) of the container.

According to a third variant embodiment, the drawing-off needle is in a vertical position.

According to one embodiment of the two preceding variants of the invention, the air stream leaving the side openings is oblique and is directed from the top downward. This air stream has an angle relative to the horizontal, which is between 10° and 80°, preferably between 20 and 50°, preferably between 25 and 400 and more preferably still 30°.

According to another embodiment, the blowing means comprise three to twenty, preferably five to twelve and more preferably still 8 side openings.

According to yet another embodiment, these side openings are distributed in a radiating manner, and are positioned in the same, preferably horizontal, plane.

According to yet another variant embodiment, the drawing-off device is characterized in that:

- the distance separating the side openings from the inside wall(s) of the container is between 30 and 70%, preferably between 40 and 60% of the diameter of the needle,
- the diameter of each opening is between 3 and 25%, preferably between 5 and 15%, and more preferably still equal to 10% of the diameter of said needle and/or
- the position of each opening relative to the free lower end of the needle is between 50 and 150%, preferably between 80 and 120%, and more preferably still equal to 100% of the inside diameter of said container.

According to one embodiment of the variant described above, the drawing-off device is characterized in that:

- the distance separating the side openings of the inside wall(s) of the container is between 1 and 10 millimeters, preferably between 2.5 and 4 millimeters, and more preferably still between 2.75 and 3,
- the diameter of each opening is between 0.1 and 1 millimeter, preferably between 0.3 and 0.6 millimeter, and more preferably still 0.4 millimeter, and/or the position of each opening relative to the free lower end of the needle is between 3 and 25 millimeters, preferably between 6 and 15 millimeters, and more preferably still 9 millimeters.

Regardless of the variant or embodiment, the drawing-off device is characterized in that the blowing means comprise a closed sleeve having at least one pulsed gas, preferably air, inlet.

In a specific case, the device is characterized in that the sleeve is a closed tube, which completely or partially surrounds the drawing-off needle.

The present invention also relates to a method for drawing off a liquid from a container using a drawing-off device as described above and comprising the following steps:

introducing the free lower end of the drawing-off needle into the container, activating the blowing means allowing the drops of liquid present on the inside wall(s) of the container in the bottom section of said container to be concentrated, sucking all or part of the liquid present in said container by said free lower end of the needle.

According to a first embodiment, the three steps of introduction, activation of the blowing means (8) and suction are sequential.

According to a second embodiment, the introduction step and the step of activation of the blowing means are performed simultaneously.

According to a third embodiment, the first step of introduction and the second step of activation are sequential but with an overlapping period, the introduction ending when the activation has already started.

Finally, the drawing-off device may be used so as to control the level of the liquid present in a container.

BRIEF DESCRIPTION OF THE DRAWINGS

The present invention will be described in relation to the accompanying figures given by way of examples as a guide which are not limiting but represent a preferred embodiment of said invention.

Finally.

DETAILED DESCRIPTION OF EMBODIMENTS

The present invention relates to a device for drawing off a liquid from a container represented in all of FIGS. 1 to 6.

Figure 1:
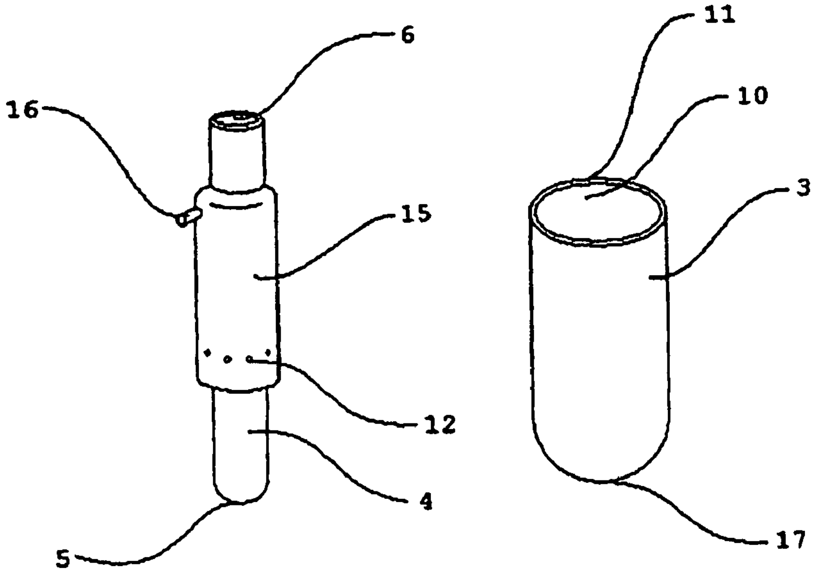
FIG. 1 represents a schematic perspective view of a drawing-off device according to the invention and a container liable to contain the liquid to be delivered or to be drawn off.
Figure 2:
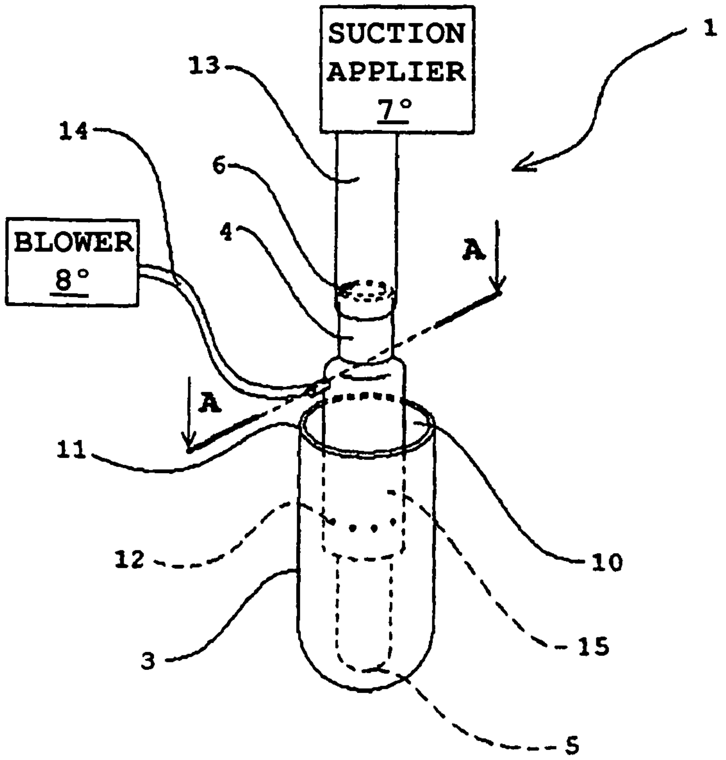
FIG. 2 represents an identical view to that of FIG. 1, when the drawing-off device is connected to means allowing its good operation and when it is introduced into the container.
Figure 3:
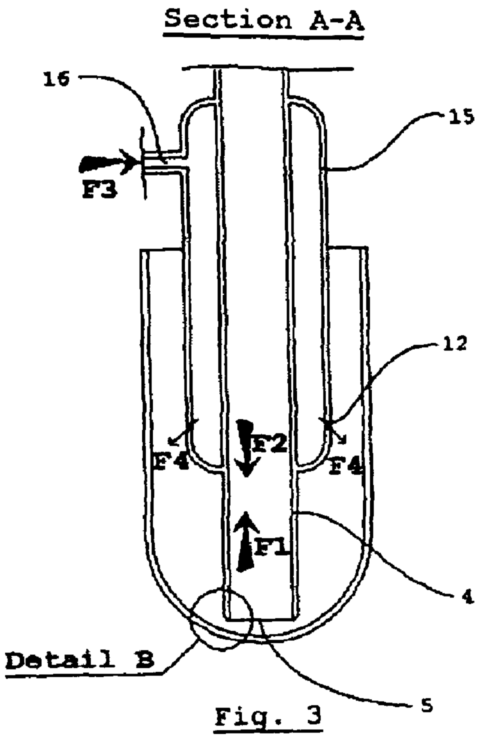
FIG. 3 represents a partial longitudinal sectional view of the drawing-off device and of its container according to the invention, according to an A-A axis represented in FIG. 2.
Figure 4:
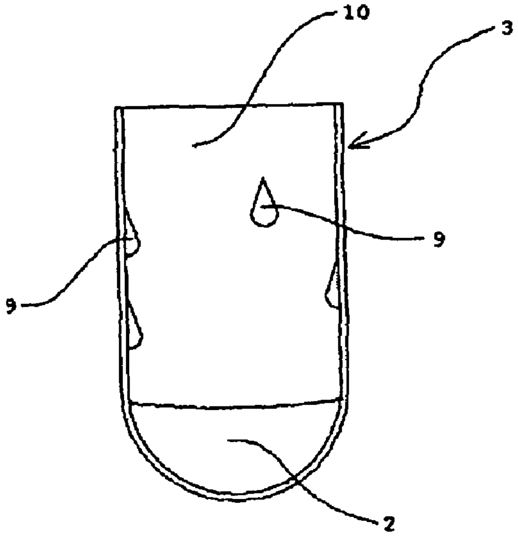
FIG. 4 represents a sectional view of a container intended to contain the liquid to be drawn off.
Figure 5:
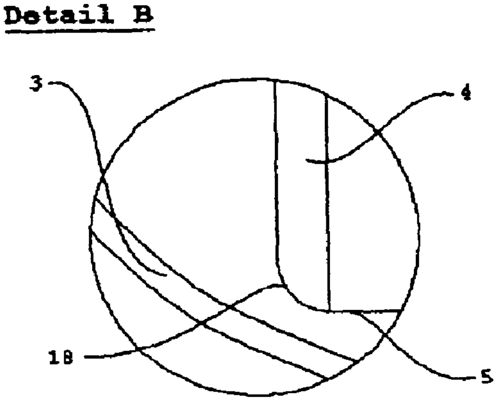
FIG. 5 represents a detail B of FIG. 3 representing the lower end of the drawing-off needle according to a first embodiment.

FIGS. 1 to 3 represent the drawing-off device 1 in the absence of any liquid to be drawn off. This drawing-off device 1 is indeed represented in FIGS. 1 and 2 and consists essentially of a drawing-off needle 4 having a free lower end 5 and an upper end 6, said needle 4 being in a vertical position.

Also represented in FIG. 1 separately from the drawing-off device 1 is a container 3, itself consisting of a tube, having a diameter greater than that of the lower end 5 of the needle 4, and open at its upper end 11 and closed at its lower end 17, this tube being liable to contain a liquid to be drawn off.

FIG. 2 represents a drawing-off device 1 after its introduction along a vertical axis into the container 3, said container 3 with a conventional shape having an inside wall 10 and an external wall, not designated by a reference. The upper end 6 of the drawing-off needle 4 is connected to suction-delivery means 7 by means of a flexible tubing 13. These means 7, known to a person skilled in the art, will not be disclosed in greater detail. They may just consist of a peristaltic pump, or any other equivalent means, such as time-pressure-vacuum systems, which are based on the principle of a principal reservoir under pressure (or under vacuum according to the requirement of the application) whose outlet has a tube provided with an electrovalve controlled by an electronic device using a time base in order to produce its open-close switch.

The drawing-off device 1 according to the invention operates according to a suction-delivery mode, as indicated by the streams F1 (suction) and F2 (delivery) in FIG. 3. It also comprises blowing means 8 located on the side of the drawing-off needle 4. These blowing means 8 consist of a sleeve 15, the needle 4 being in a coaxial and concentric position relative to the sleeve 15. Said sleeve 15 is, for its part, closed and only has:

one top opening/inlet 16 which is connected, via a flexible tubing 14, to the blowing means 8, into which a pulsed gas stream is discharged according to F3, and at least one side opening 12, in the lower position through which a pulsed gas stream is discharged according to F4, this pulsed gas being preferably air.

The initial gas stream, according to F3, therefore comes from the blowing means by the inlet 16, said inlet 16 being connected to the blowing means 8 by a flexible tubing 14. The circulation of gas from the inlet 16 to the side openings 12 therefore occurs through the closed sleeve 15. Preferably, the side openings 12 are implanted in a radiating manner on said sleeve 15, so as to improve the efficiency of the device. In general, the entire blowing means therefore consists of the blowing means 8 themselves, the flexible tubing 14, the side openings 12 and the sleeve 15.

Figure 7:
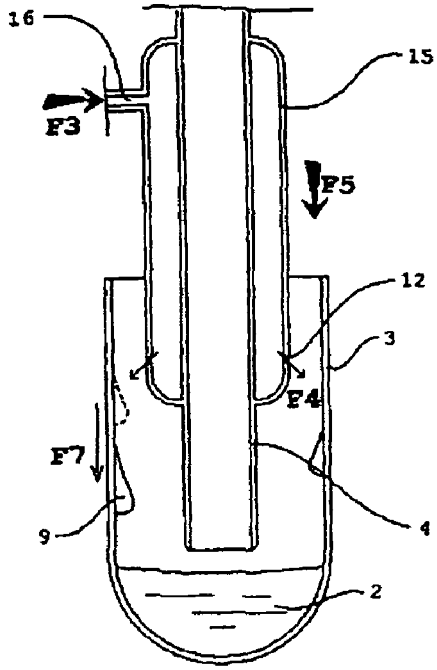
FIG. 7 represents an identical view to that of FIG. 6, the drops of liquid being displaced toward the bottom section of the container under the action of the blowing means.
Figure 8:
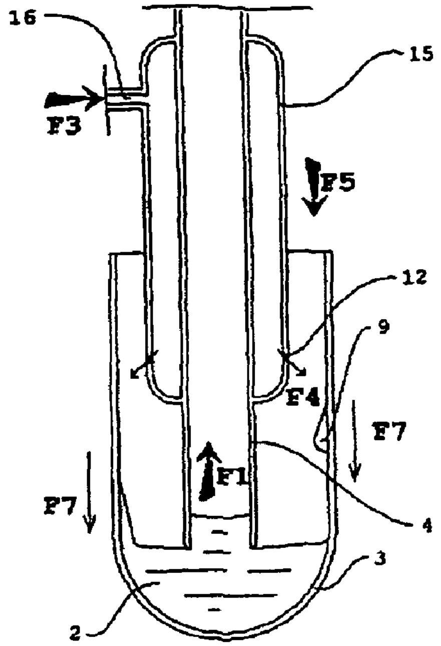
FIG. 8 represents the step of sucking, by the drawing-off needle, the liquid present in the container.
Figure 10:
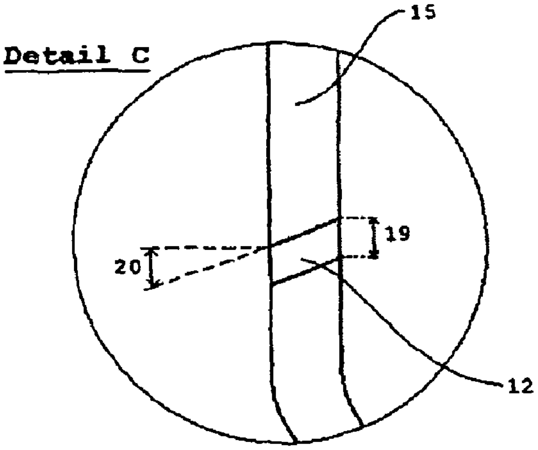
FIG. 10 represents a detail C of FIG. 9.
Figure 9:
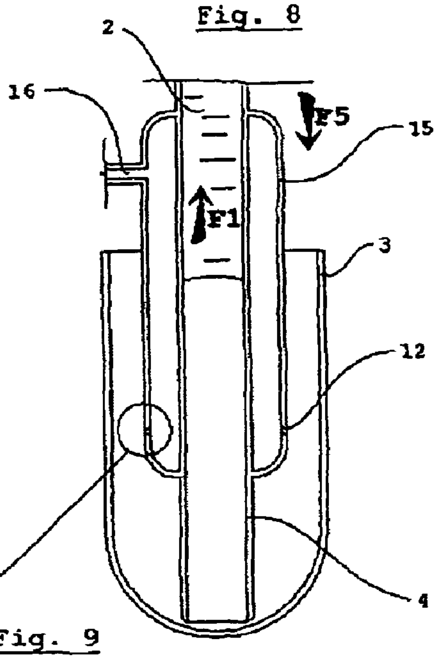
FIG. 9 represents a sectional view identical to that of FIG. 8, when the entire liquid has been drawn off.

Each opening 12 implanted on the sleeve 15 is represented on the detail C of FIG. 10. The diameter 19 of the opening 12 is between 0.1 and 1 millimeter, preferably between 0.3 and 0.6 millimeter, and more preferably still 0.4 millimeter. The pulsed gas stream, according to F4, coming from the openings 12 is in an oblique position relative to the horizontal, and is directed from the top downward, which makes it possible to concentrate the drops 9 present on the side and inside wall 10 (see FIG. 4), the drops 9 being in a position distant from the lower end 17 of the container 3, and the air stream according to F4 directing them toward this lower end 17 of said container 3 as represented in FIGS. 7 to 9. The angle existing between the horizontal 20 and the gas stream (F4) coming from the openings 12 is therefore between 10° and 80°, preferably between 20° and 50°, preferably between 25 and 40°, and more preferably still 30°.

The drawing-off device 1 according to the invention may thus be used to draw off a liquid 2 contained in a container closed at its upper end, for example by an external aluminum film. In this case, it is necessary to perforate the external film so that the lower end 5 of the drawing-off needle 4 can reach the liquid to be drawn off 2. As the detail B of FIG. 5 indicates, the free lower end 5 of the drawing-off needle 4 has a round shape 18 on the outside of the needle 4 so that when the external film is perforated during the descent of the needle toward the container, according to F5, the perforation is clean; any tear or hollow punch effect of the external film is thus avoided.

Figure 11:
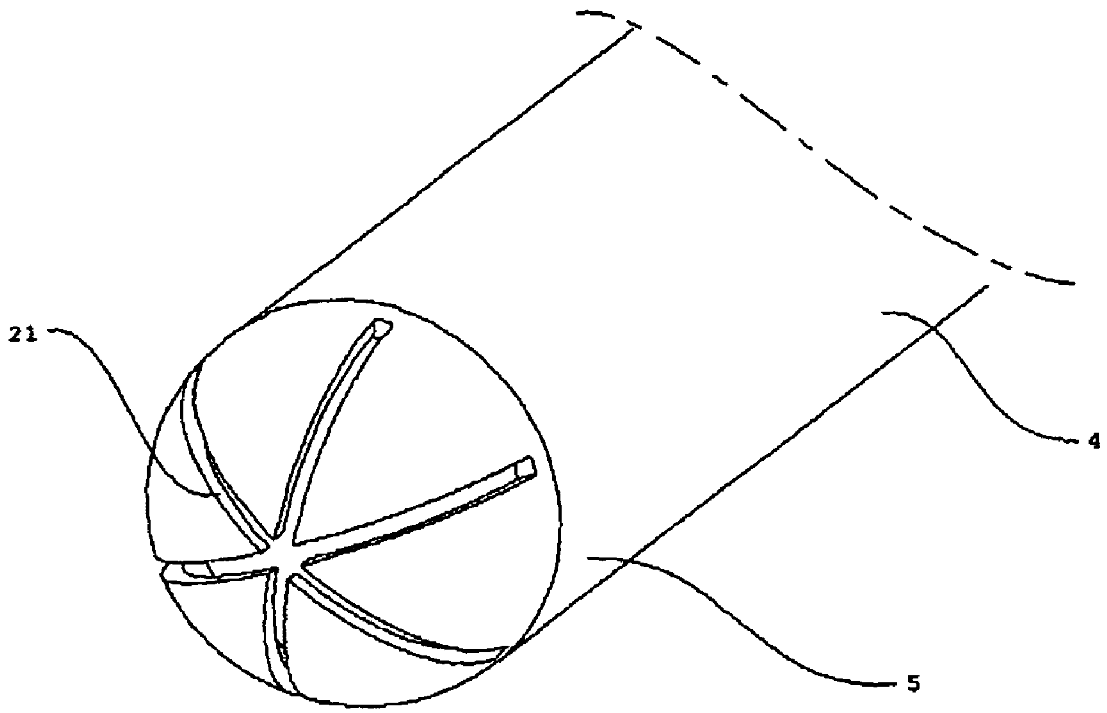
FIG. 11 represents the lower end of the drawing-off needle according to a second embodiment.

According to a second embodiment, as is indeed represented in FIG. 11, the free lower end 5 of the drawing-off needle 4 has a series of grooves 18 arranged radially or in a radiating manner, the number of which may vary from 4 to 12 with no effect on the drawing off. In the embodiment, this number is 6. Thus, when the external film is perforated during the descent of the needle toward the container, according to F5, the perforation is even cleaner; any tear or hollow punch effect of the external film is thus avoided. Furthermore, the drawing off with this embodiment is even more efficient, because its shape allows drawing off even in tubes, of the cylinder type, whose space situated at the bottom is difficult to reach. Interestingly, its external radius of curvature is adapted to the internal radius of curvature of the bottom of the container. Alternatively, the external radius of curvature of the drawing-off needle 4 adopts the internal radius of curvature of the bottom of the container, that is say a slightly lower radius in order to allow a complete support between the two internal and external surfaces.

Regardless of the embodiment of the drawing-off needle 4, the diameter of said needle 4 is, on the embodiment presented, 3.5 millimeters.

When the drawing-off device 1 is used, according to FIGS. 6 to 9, the drawing-off needle 4 descends into the container 3 along the direction F5.

Figure 6:
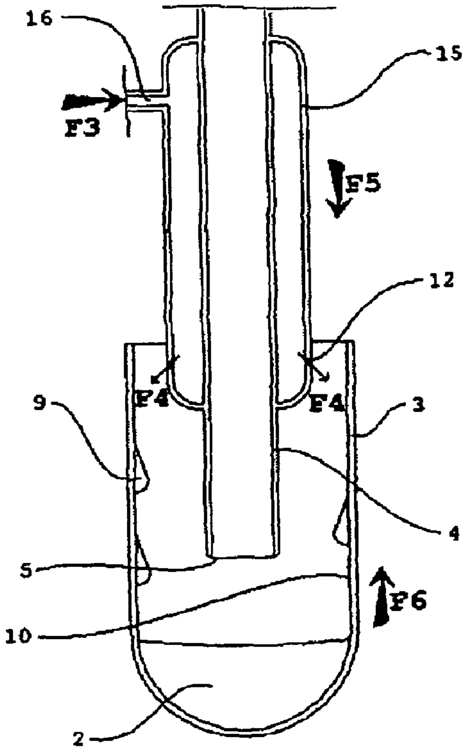
FIG. 6 represents the introduction of the free lower end of the drawing-off needle into the container and the activation of the blowing means.

Said container 3 may also be directed toward the needle 4 along the direction F6 represented in FIG. 6. The activation of the blowing means 8 brings about the creation of a gas stream according to F3 which penetrates into the inlet 16. This gas stream circulates in the sleeve 15 and leaves it again according to F4 by the side openings 12. The discharge of the gas toward the inside wall 10 of the container 3 makes it possible to detach and therefore displace, according to F7, and to concentrate toward the bottom section 17 of the container 3, the drops of liquid 9 present on said wall 10.

The present invention also relates to a method for drawing off, represented in all of FIGS. 7 to 10.

In the embodiment represented in FIG. 7, the step of introducing the needle 4 and the step of activating the blowing means 8 are simultaneous, the descent according to F5 of the needle 4 into the container 3 occurring at the same time as the arrival of gas, according to F3, in the sleeve 15. When the lower end 5 of the drawing-off needle 4 is in contact with the liquid 2 present in the container 3, the suction of the liquid 2 by the drawing-off needle 4 begins, according to F1, the blowing means 8 being always activated.

When the entire liquid 2 initially present in the container 3 has been drawn off by the needle 4, according to F1, the blowing means 8 are deactivated, the drawing-off needle 4 still being positioned in said container 3.

REFERENCES

1—Drawing-off device
2—Liquid
3—Container
4—Drawing-off needle
5—Free lower end of the needle (4)
6—Upper end of the needle (4)
7—Suction-delivery means
8—Blowing means
9—Drops of liquid 2 present on the inside wall 10 of the container 3
10—Inside wall(s) of the container 3
11—Upper end of the container 3
12—Side opening to the needle
13—Flexible tubing connecting the suction-delivery means 7 with the upper end 6 of the needle 4
14—Flexible tubing connecting the blowing means 8 with the gas (air) inlet 16
15—Sleeve
16—Gas (air) inlet into the sleeve 15
17—Lower end of the container 3
18—Roundness present at the lower end 5 of the needle 4
19—Diameter of each opening 12
20—Angle between the air stream F4 generated by the openings 12 and the horizontal
21—Grooves of the lower end 5 of the needle 4
F1—Suction of the liquid 2 by the needle 4
F2—Delivery of the liquid 2 by the needle 4
F3—Inlet for gas (air) in the sleeve 15 coming from the blowing means 8
F4—Gas (air) stream coming from the opening 12
F5—Descent of the needle 4 into the container 3
F6—Rise of the container 3 toward the needle 4
F7—Displacement of a drop 9 along a wall 10 under the effect of the stream according to F3

The invention claimed is:

1. A device for drawing off a liquid from a container comprising:
- a drawing-off needle having a free lower end and an upper end,
- suction-delivery means connected to the upper end of the needle, and
- blowing means carried by said needle allowing drops of the liquid present on the inside wall(s) of the container in the bottom section of said container to be concentrated.

2. The device as claimed in claim 1, wherein the needle consists of a tube open at both its ends, and in that the container consists of a tube of greater diameter open only at its upper end.

3. The device as claimed in claim 1, wherein the blowing means comprise at least one side opening to the needle allowing an air stream to be sent over the inside wall(s) of the container.

4. The device as claimed in claim 3, wherein the air stream is oblique and is directed from the top downward.

5. The device as claimed in claim 3, wherein the air stream has an angle relative to the horizontal, which is between 10° and 80°.

6. The device as claimed in claim 3, wherein the blowing means comprise three to twenty side openings.

7. The device as claimed in claim 6, wherein the side openings are radiating.

8. The device as claimed in claim 6, wherein the side openings are positioned in the same horizontal plane.

9. The device as claimed in claim 3, wherein at least one of the following criteria is satisfied:

a distance separating the side openings from the inside wall(s) of the container is between 30 and 70% of the diameter of the needle, a diameter of each opening is between 3 and 25% of the diameter of said needle and a position of each opening relative to the free lower end of the needle is between 50 and 150% of the diameter of said needle.

10. The device as claimed in claim 9, wherein at least one of the following criteria is satisfied:

the distance separating the side openings of the inside wall(s) of the container is between 1 and 10 millimeters, the diameter of each opening is between 0.1 and 1 millimeter, and the position of each opening relative to the free lower end of the needle is between 3 and 25 millimeters.

11. The device as claimed in claim 1, wherein the drawing-off needle is in a vertical position.

12. The device as claimed in claim 1, wherein the blowing means comprise a closed sleeve having at least one pulsed gas inlet.

13. The device as claimed in claim 12, wherein the sleeve is a closed tube which completely or partially surrounds the drawing-off needle.

14. A method for drawing off a liquid from a container using the device as claimed in claim 1, and comprising the following steps:

introducing the free lower end of the drawing-off needle into the container, activating the blowing means allowing the drops of liquid present on the inside wall(s) of the container in the bottom section of said container to be concentrated, and sucking all or part of the liquid present in said container by said lower end of the needle.

15. The method as claimed in claim 14, wherein the three steps of introduction, activation of the blowing means and suction are sequential.

16. The method as claimed in claim 14, wherein the first step of introduction and the second step of activation of the blowing means are simultaneous.

17. The method as claimed in claim 14, wherein the first step of introduction and the second step of activation of the blowing means are sequential but with an overlapping period, the introduction ending when the activation has already started.

18. A method for controlling the level of liquid in a container comprising drawing-off liquid from the container using the device of claim 1.

* * * * *